(No Model.)
J. DAVIE & J. WOTHERSPOON.
FEED WATER FILTERING APPARATUS.
No. 593,740. Patented Nov. 16, 1897.
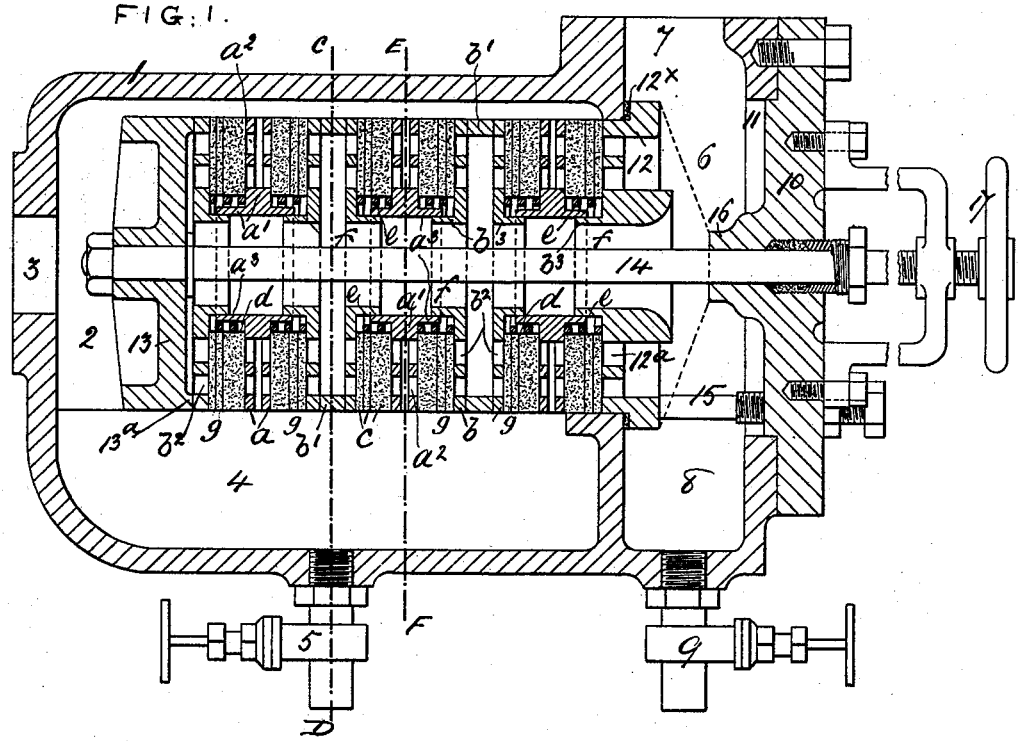
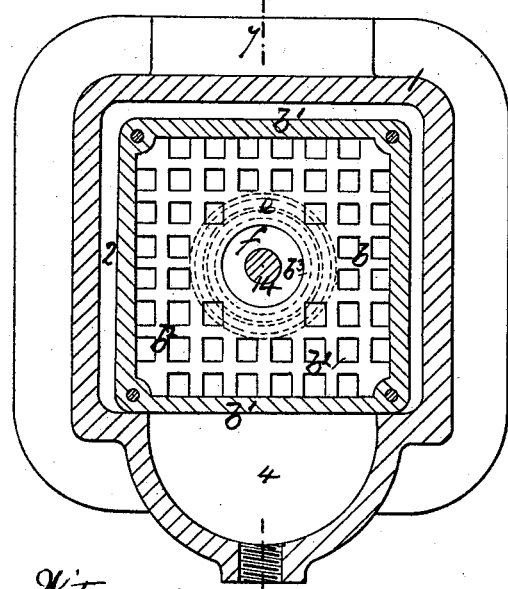
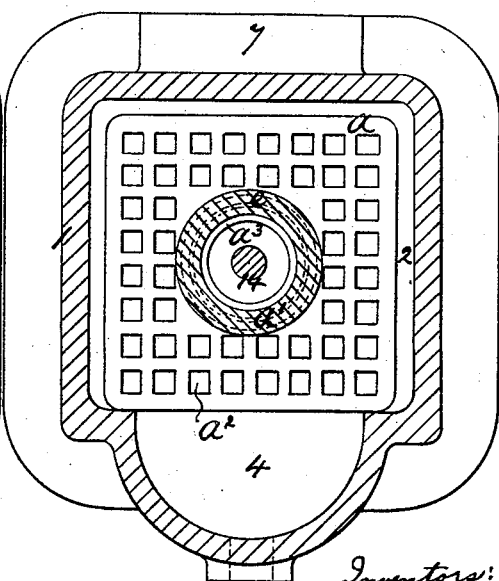
Witnesses:
C. Holloway
H. C. Pinckney
Inventors:
John Wotherspoon
James Davie
By J&M Crowe
Atty

UNITED STATES PATENT OFFICE.

JAMES DAVIE, OF GLASGOW, SCOTLAND, AND JOHN WOTHERSPOON, OF LONDON, ENGLAND.

FEED-WATER-FILTERING APPARATUS.

SPECIFICATION forming part of Letters Patent No. 593,740, dated November 16, 1897.

Application filed May 27, 1897. Serial No. 638,327. (No model.)

*To all whom it may concern:*

Be it known that we, JAMES DAVIE, of Crosshill, Glasgow, Lanarkshire, Scotland, and JOHN WOTHERSPOON, of Forest Hill, London, Kent county, England, subjects of the Queen of Great Britain and Ireland, have invented certain new and useful Improved Feed-Water-Filtering Apparatus, of which the following is a specification.

This invention relates to filtering apparatus for purifying feed-water for marine and other steam boilers, particularly to that class of such apparatus wherein the filtering material is located within a chamber and between a stationary plate and an opposing adjustable plate, by which it can, from time to time, be cleansed by being compressed so as to cause the matter arrested by it to exude therefrom into a sediment-chamber, the object of the invention being to obtain a largely-increased or multiple filtering area within the one filter-body, as hereinafter described; and to this end the invention consists in the combination of parts hereinafter more particularly described with reference to the accompanying drawings and particularized in the claim.

On the accompanying drawings, Figure 1 represents a longitudinal sectional elevation on the line A B, Fig. 2, and is partly in elevation; and Figs. 2 and 3 represent transverse sectional elevations, respectively on the lines C D and E F, Fig. 1.

1 represents the main body of the filter, which is parallel-sided and may be of a square shape in cross-section, as represented, or of a circular or other suitable shape. It is formed with an inlet-chamber 2, having an inlet 3, a depending sediment-collector 4, and a blow-off valve 5, and with an outlet-chamber 6, having an outlet 7, a depending sediment-collector 8, and a blow-off valve 9. One of its ends is fitted with a removable cover 10, serving to close an opening 11, through which the improved filtering device hereinafter described, together with the opposing stationary and adjustable plates 12 and 13, between which it is arranged, can be placed within and withdrawn from the filter-body, and also to support the screw-threaded spindle 14, by which the compression of the filtering media is effected for the purpose of locating it or of compressing the same to cleanse it from absorbed matter. The plate 12 is located at the junction of the chambers 2 and 6, its periphery being packed or otherwise made watertight, as at 12*, with the periphery of the filter-body and may be held in position by screws 15 or by abutting against an inner extension 16 of the cover 10, as represented by dotted lines, or in any convenient manner. The plate 13 is bolted to the spindle 14 and can be adjusted from or toward the plate 12 by turning the spindle-wheel 17, and a sufficient clearance is left between its periphery and that of the filter-body to allow of the water entering the inlet 3 circulating freely between the plate and surrounding filter-body and obtaining ready access externally to the improved filtering device at the various inlets thereto.

In the improved filtering device a series of any required number of pairs of perforated diaphragms $a$, constituting so many separate inlets to the water to be filtered, are combined telescopically with an equal number of perforated diaphragms $b$, constituting so many separate outlets from the filtered water, and with filtering media $c$, interposed between each pair of diaphragms $a\ b$, and with flexible shields $d$, arranged within the inner periphery of the filtering media $c$ and between each pair of diaphragms $a\ b$, and with springs $e$, arranged within the shields, tending to distend and support the latter in the desired relation to the media $c$, and between each pair of diaphragms $a\ b$, tending to separate the same and to press the adjacent diaphragms $b$ together. The inlet-diaphragms $a$ of each opposite pair thereof are spaced apart and are open around their outer peripheries to the inlet of water to be filtered and are closed around their inner peripheries, as at $a'$, so as to cause all the water entering therebetween to pass laterally through the perforations $a^2$ to the filtering media $c$. The outlet-diaphragms $b$ of each adjacent pair thereof are also spaced apart and are closed around their outer peripheries, as at $b'$, and are open around their inner peripheries, so as to centrally discharge the filtered water passing from the filtering media $c$ through the perforations $b^2$ to between the diaphragms $b$.

The diaphragms $a$ are formed with central annular bosses $a^3$, and the diaphragms $b$ are formed with central annular bosses $b^3$, and these bosses are telescopically arranged to accommodate the opposite actions of the spindle 14 and springs $e$ and constitute a central outlet $f$, into which the filtered water passes from between the diaphragms $b$. The adjustable plate 13 is flanged at its outer periphery, as at $13^a$, against which the adjacent diaphragm $b$ abuts, so as to space it apart from the plate. The stationary plate 12 may also be similarly flanged and adapted to support, spaced apart therefrom, an adjacent diaphragm $b$, or, as represented, it may be perforated, as at $12^a$, and adapted to serve as the equivalent of a diaphragm $b$. The plate 12 is also formed with a central boss $b^3$, serving as a continuation of the channel $f$. Around the telescoping bosses $a^3$ $b^3$ and between each pair of diaphragms $a$ $b$ is arranged one of said springs $e$ and its surrounding flexible shield $d$, which latter may consist of canvas or other suitable material.

The filtering medium interposed between each pair of diaphragms $a$ $b$ is divided by porous or perforated diaphragms $g$ into sections of media best suited to eliminate the peculiar impurities that may exist in the water to be purified, the first section preferably consisting of materials suitable for arresting greasy matters, the second of materials suitable for arresting the heavy or larger impurities, and the third of materials suitable for arresting the more minute particles.

The filter-body may, if required, be fitted with a steam-valve for cleaning purposes and with inlet and outlet valves, a by-pass valve, safety-valve, pressure-gage, and air-extractor to suit requirements.

By the described combination we considerably increase the filtering area and obtain a much more efficient action with a less liability of the filtering media becoming surcharged with arrested matter and rendered inoperative, thus maintaining its working capabilities for a longer period.

We claim as our invention—

In feed-water-filtering apparatus; in combination; a filter-body having inlet and outlet chambers and depending sediment-collectors and an end opening 11, adapted with a removable cover, an adjusting-screw 14, a fixed plate 12, and adjustable plate 13; and a filtering device composed of series of pairs of perforated inlet-diaphragms $a$, spaced apart, closed at their inner peripheries, and formed with central annular bosses $a^3$, perforated outlet-diaphragms $b$, spaced apart, closed at their outer peripheries and formed with central bosses $b^3$, the bosses $a^3$, $b^3$, being telescopically arranged and constituting a central outlet, filtering media $c$, and separating-diaphragms $g$, interposed between each pair of diaphragms $a$, $b$, and flexible shields $d$, and contained springs $e$, arranged within the inner periphery of the media $c$, and between each pair of diaphragms $a$, $b$, the whole adapted to coöperate, as set forth.

Signed at Glasgow, Scotland, by the said JAMES DAVIE, this 3d day of May, 1897.

JAMES DAVIE.

Witnesses:
JAMES J. INGLES,
JNO. McFADGEAN.

Signed by the said JOHN WOTHERSPOON, at Forest Hill, London, England, this 6th day of May, 1897.

JOHN WOTHERSPOON.

Witnesses:
ALFRED NATTING,
F. JAMES HOLE.